United States Patent [19]

Leung

[11] Patent Number: 6,002,552
[45] Date of Patent: Dec. 14, 1999

[54] ADAPTIVE LOADING/UNLOADING SUSPENSION

[75] Inventor: Chak M. Leung, Palo Alto, Calif.

[73] Assignee: Read-Rite Corporation, Milpitas, Calif.

[21] Appl. No.: 09/232,901

[22] Filed: Jan. 19, 1999

Related U.S. Application Data

[62] Division of application No. 08/874,076, Jun. 12, 1997.

[51] Int. Cl.⁶ ............................... G11B 5/48; G11B 21/02
[52] U.S. Cl. .............................................. 360/104; 360/75
[58] Field of Search ............................... 360/75, 103–105

[56] References Cited

U.S. PATENT DOCUMENTS 4,996,616 2/1991 Aoyagi et al. ........................... 360/104
5,612,841 3/1997 Johnson ................................... 360/104

*Primary Examiner*—Allen T. Cao
*Attorney, Agent, or Firm*—Nathan N. Kallman

[57] ABSTRACT

A head gimbal assembly includes an adaptive loading/unloading suspension with an aerodynamic compensation mechanism formed with or attached to the load beam. The compensation mechanism causes a variable and programmable dynamic gram load to be applied on the suspension such that a low gram load is achieved at the time of dynamic head loading, thus significantly minimizing or totally eliminating head-to-disk contact. The variable suspension gram load feature can be combined with an air slider bearing design to achieve optimal flying height performance and cost effectiveness. Such combination provides the air bearing design with an additional degree of freedom to achieve a more uniform flying height and improved altitude sensitivity than under a constant preload.

12 Claims, 10 Drawing Sheets

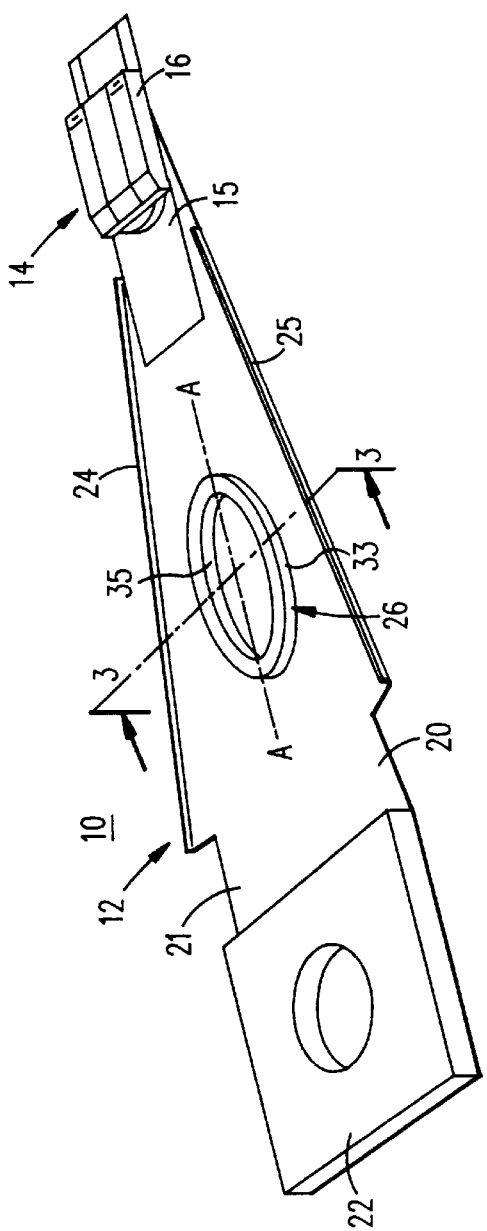
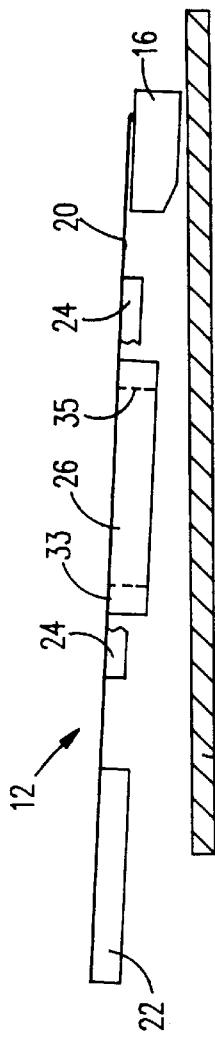
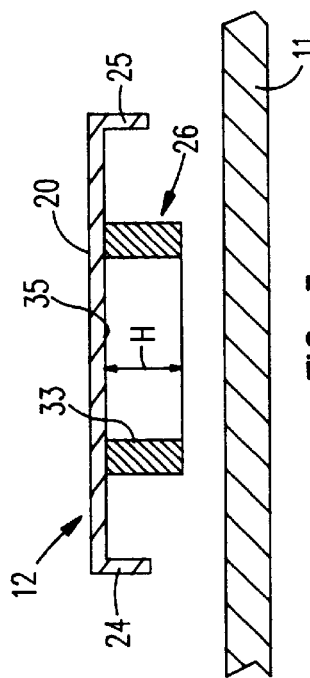
FIG. 1
FIG. 2
FIG. 3

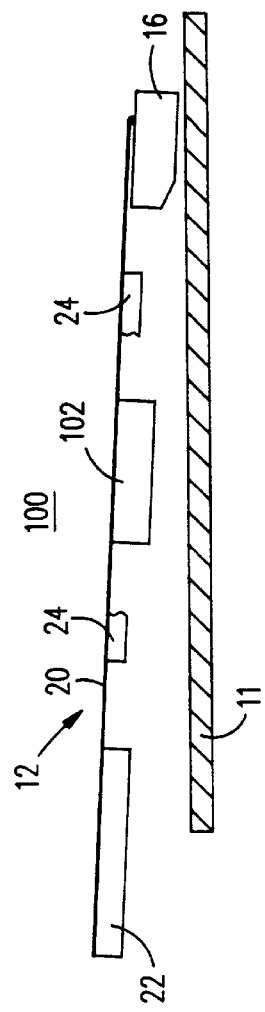
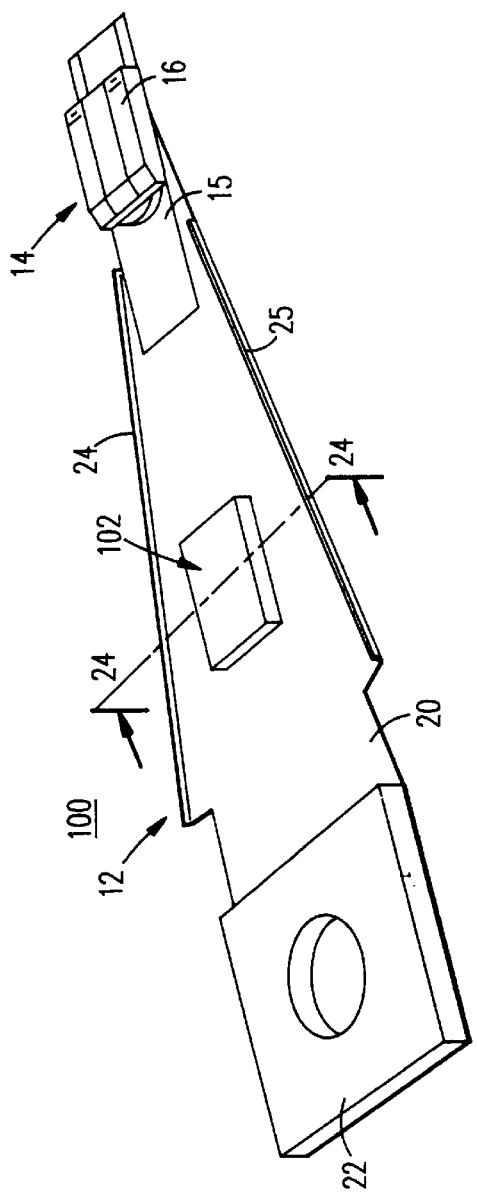
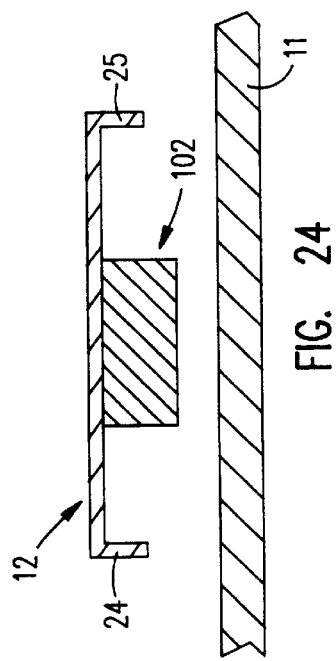
FIG. 22
FIG. 23
FIG. 24

ADAPTIVE LOADING/UNLOADING SUSPENSION

This application is a division of Ser. No. 08/847,076 filed Jun. 12, 1997.

FIELD OF THE INVENTION

The present invention relates to disk drives and in particular to a disk drive having a self-loading/unloading suspension.

BACKGROUND OF THE INVENTION

Presently known magnetic disk drives typically include magnetic storage disks and head suspension assemblies having air bearing sliders on which magnetic transducers are disposed. The air bearing sliders in a rigid disk drive fly above the disk surface. In such disk drives, it has been customary to start and stop the operation by a contact start/stop (CSS) process. One design objective of conventional magnetic disk drives is to cause most of the wear to occur at the slider/disk interface during the start and stop stages. Minimal wear during the start and stop stages is crucial but is often difficult to achieve.

A prerequisite to the CSS process is that the surface of the magnetic disk be roughened to a degree sufficient to prevent high stiction that causes the air bearing slider and the disk to adhere while the disk is not in operation. Moreover, in order to meet the demand for increased areal density, efforts have been made to minimize the head flying height, which requires smoother disks.

In light of these design objectives attempts have been made to decrease the slider size and to design new loading/unloading mechanisms for avoiding contact start/stop. Conventionally, a constant gram load is provided to the head suspension for loading the magnetic head to the disk. The gram load acts to counterbalance the effect of the air bearing lift force. However, when the air bearing lift force is removed, the head contacts the disk, thus generating wear and debris, and compromising data integrity, which could eventually lead to a head crash.

Dynamic head loading/unloading mechanisms have been designed to maintain an acceptable flying height of the head over the disk. U.S. Pat. Nos. 5,289,325; 5,237,472; 5,469,314; and 5,486,964 to Morehouse et al. are exemplary of a rigid disk drive with a dynamic head loading/unloading apparatus. The disk drive includes a rotary actuator having a lift tab that extends asymmetrically from the end of the load beam. The free end of the lift tab cooperates with a cam surface on a cam assembly to provide dynamic loading and unloading of the slider while imparting a roll to the slider as it is loaded to and unloaded from the disk.

While these dynamic loading/unloading mechanisms may have solved certain concerns associated with prior static loading/unloading mechanisms, they still suffer from several drawbacks. The dynamic loading/unloading mechanisms have relatively complex designs, and they require a very tightly controlled loading angle. In addition, the loading/unloading cam prevents the optimization of the z-height of the suspension, that is the distance between the suspension mounting surface and the disk surface.

Furthermore, under a constant preload, the flying height of some slider air bearing designs, e.g., twin rail taper flat, is not uniform, but is typically lower at the inner diameter (ID) of the disk than at the outer diameter (OD). The radial dynamic loading on a ramp forces the slider to develop an air bearing with a severe initial roll increasing the likelihood of a head crash. In addition, the ramp loading scheme lacks the precision control intrinsic in a finely controlled rotational speed and acceleration of the disk.

Conventional disk drives are altitude sensitive. As the altitude increases, the flying height decreases so that the air bearing force could counteract the constant preload.

SUMMARY OF THE INVENTION

It is an object of the present invention to substantially reduce, if not eliminate the CSS process in head loading/unloading mechanisms.

It is another object of the present invention to provide a compensation mechanism whereby a self-adjusting suspension automatically adapts to the various positions of the slider relative to the disk, so as to maintain the head flying height substantially uniform across the entire disk surface.

It is still another object of the present invention to provide a compensation mechanism whereby the self adjusting suspension accounts for changing environmental conditions.

According to the present invention, an aerodynamic compensation mechanism is secured to or formed within the load beam. The compensation mechanism causes a variable and programmable dynamic gram load to be applied on the suspension such that a low gram load is achieved at the time of dynamic head loading, thus significantly minimizing or totally eliminating head-to-disk contact. The variable suspension gram load feature can be combined with the air slider bearing design with optimal flying height performance and cost effectiveness. Such combination will provide the air bearing design with an additional degree of freedom to achieve a more uniform flying height and improved altitude sensitivity than under a constant preload.

The suspension of the present invention can be implemented with conventional manufacturing techniques with minimal changes to the suspension design, hence minimizing the creation of undesirable resonances. The suspension minimizes debris generation and power consumption. The cleanliness of the disk plays an essential role in disk drives and particularly those using optical data reading and recording media.

By using the self loading suspension of the present invention it is possible to increase the z-height tolerance of the entire head stack as well as of the individual head. Each head will have a substantially independent z-height which tightly matches its corresponding disk surface.

The present suspension simplifies the assembly process and improves the manufacturing throughput. In addition, the self loading suspension could position the slider directly over the disk before the air bearing develops, thus minimizing the initial roll during the development of the air bearing.

The self-loading suspension eliminates the radial movement of the slider and allows the head to come down vertically during the operating loading process, which is the same direction for which the air bearing is designed for an on-track read/write operation.

The high precision motor controller for the disk can be utilized to create an optimal RPM (revolutions per minute) acceleration schedule. This, in turn, creates an optimized loading that minimizes the initial loading time and further creates a gentle increase in the final stages of the dynamic gram load to result in an extremely gentle loading and unloading stages for reaching the desired operating conditions.

BRIEF DESCRIPTION OF THE DRAWING

The invention will be described in greater detail with reference to the drawing in which:

FIG. 1 is a perspective view of a suspension including an aerodynamic device according to the present invention;

FIG. 2 is a side view of the suspension of FIG. 1 shown positioned above a data storage medium;

FIG. 3 is a cross-sectional view of the suspension and the aerodynamic device of FIG. 1 taken along line 3—3;

FIG. 22 is a perspective view of a suspension including an aerodynamic device according to another embodiment of the present invention;

FIG. 23 is a side view of the suspension of FIG. 22 shown positioned above a data storage medium;

FIG. 24 is a cross-sectional view of the suspension and the aerodynamic device of FIG. 22 taken along line 24—24;

Similar numerals refer to similar elements in the drawing. It should be understood that the sizes of the different components in the Figures may not be in exact proportion, and are shown for visual clarity and for the purpose of explanation.

DETAILED DESCRIPTION OF THE PREFERRED EMBODIMENTS

Figure 4:
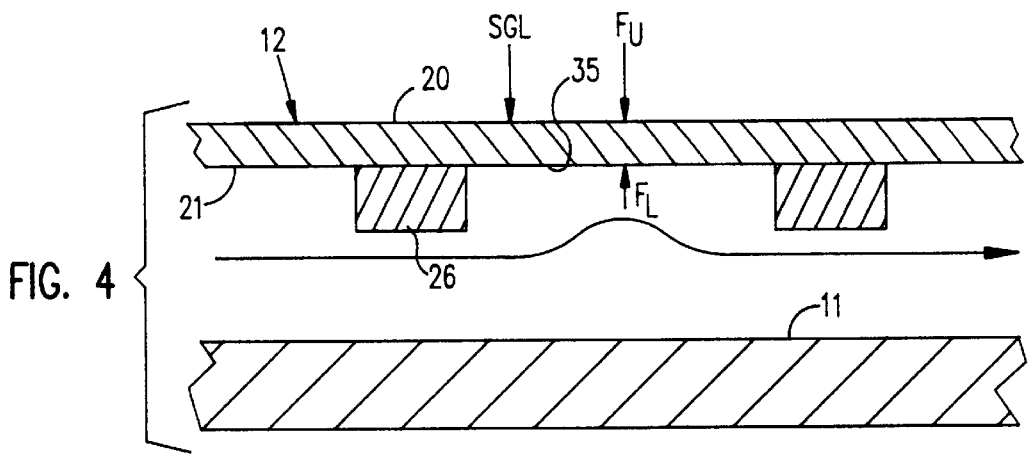
FIG. 4 is an enlarged view of FIG. 3 showing air flow past the aerodynamic device and the various forces applied to the suspension.

FIGS. 1, 2 and 3 illustrate a head suspension assembly formed with a head gimbal assembly (HGA) 10, comprising an adaptive suspension 12, a flexure 15 and an air bearing slider 16 secured to the flexure 15. In the embodiment illustrated herein the term "adaptive" implies flexibility, self-adjustment, automatic adjustment, external programmability, with the ability to have numerous loading/unloading schemes that are customizable to specific applications, and other features that optimize or improve the aerodynamic performance of the HGA 10 and that allow the head suspension assembly to compensate for disk radius effects, and to further compensate for atmospheric condition changes. The HGA 10 may be used with various types of storage drives, including but not limited to magnetic, optical, or magneto-optical drives. The slider 16 carries a read or write element 18 such as a magnetic transducer, as is shown in FIG. 1, or any other suitable assembly, for example an optical assembly for reading and/or writing data on the disk 11. The slider 16 will also be referred to as a support element. While the slider 16 is illustrated as being secured to the free end of a load beam 20, it should be clear that in other embodiments the support element or slider 16 may be positioned at a different location along the length of the load beam 20.

The load beam 20 is secured at a rear end to a base plate 22 and at its forward end to the flexure 15. Two side rails 24, 25 provide added rigidity and stability to the load beam 20.

An inventive feature of the present invention is to alter the pressure profile generated by the air flow pattern along the underside 21 of the load beam 20 facing the disk 11. This feature is achieved by forming an aerodynamically shaped device on the underside 21. As used herein, the device may be formed separately from the suspension 12 and then bonded thereon; or alternatively it may be formed integrally within the suspension.

FIGS. 1, 2 and 3 illustrate an exemplary aerodynamic device 26 that alters the air flow pattern along the underside 21 of the otherwise smooth surface of the load beam underside 21 to generate either a positive pressure or sub-ambient (e.g. negative) pressure onto the suspension 12. The device 26 acts as a compensation mechanism that cooperates with the air flow generated by the rotation of the disk 11 to account for the air bearing and the suspension preload. As used herein the preload is a constant bending force defined by the bending of the load beam 20 as is well known in the art. In existing technology the preload is equated to the operating or static gram load (SGL).

The aerodynamic performance of the device 26 depends upon its geometrical shape, its distance from the disk 11, its skew angle relative to the load beam, and the disk velocity. By changing the design and orientation of the device 26 it is possible to create a different dynamic gram load (DGL) profile (to be defined later) across the entire surface of the disk.

The device 26 shown in FIGS. 1 through 3 represents a first exemplary suspension design according to the present invention. The device 26 has a ring-like shape and is defined by an oval wall 33 that encloses a cavity 35. The device 26 may be made of the same material as the load beam 20, such as stainless steel. Alternatively, the device 26 may be made of another suitable material, such as ceramic or plastic. The device 26 is secured to the underside 21 of the load beam 20 by adhesive bonding or welding, for example. While the device 26 will be described as a separate device that is added and secured to the suspension 12, it should be clear to those of ordinary skill in the art that the device 26 may be formed as an integral part of the suspension 12 by deforming (or forming) the load beam to simulate the aerodynamic shape and performance of the device 26.

In the present example, the device 26 has a closed ring configuration, for instance oval, and has its major axis AA coincide with the axis of symmetry of the load beam 20, such that in an ideal case, the skew angle between these two axes is substantially zero. This reduces the off-center or skewed masses and residual bias torques, which benefits the on track and seeking operation of the head assembly. This skew angle may also be finite to change the DGL profile across the disk 11. In another embodiment the minor axis of the device 26, which is perpendicular to the major axis AA, may be aligned with the major axis of the load beam 20. It should be clear that the device 26 may have different configurations. For instance, the device 26 may be circularly shaped. In addition, a plurality of devices 26 may be formed at the underside 21.

The thickness of the wall 33 may vary with the intended application of the suspension 12. The height (H) of the wall 33 is such that the device 26 does not touch the disk 11 in operation, thus defining a clearance between the wall 33 and the disk 11. The device 26 could weigh about 10 milligrams and could generate about 1 gram of dynamic gram load (DGL). The device 26 may be located at any section of the load beam 20, provided it satisfies the aerodynamic performance requirements as described herein.

In a conventional device the total gram load (also indicated by $F_{NET}$) acting on the suspension is defined by the following equation (1):

$$\text{Total Gram Load} = F_{NET} = SGL + F_U - F_L, \quad (1)$$

where $F_U$ is the force acting on the side of the suspension facing away from the disk; and $F_L$ is the force acting on the opposite side of the suspension (i.e., facing toward the disk). $F_U$ is typically the ambient pressure force, and is equal in magnitude to $F_L$. As a result, the Total Gram Load is equal to SGL.

FIG. 4 illustrates the air flow past the suspension 12 and the various forces applied to the suspension 12. The above equation (1) applies equally to the suspension 12. However, the forces $F_U$ and $F_L$ are not equal, since a dynamic gram load (DGL) is generated by the aerodynamic device 26, when the disk and the suspension are in relative motion. In this embodiment, DGL is defined as the difference between $F_U$ and $F_L$, i.e., (DGL=$F_U - F_L$) resulting in the following equation (2):

$$\text{Total Gram Load} = F_{NET}$$
$$= SGL + (F_U - F_L)$$
$$= SGL + DGL. \quad (2)$$

In a specific embodiment where SGL equals zero, the total gram load equals DGL.

As the velocity of the disk 11 increases the device 26 causes DGL to develop further and to attract the suspension 12 toward the disk 11. DGL results from the sub-ambient pressure developed by the aerodynamic shape of the device 26.

A small dynamic gram load (DGL) enables a partially developed air bearing to stabilize over the disk at a relatively elevated flying height. As a result, it is now possible to eliminate the angled loading ramp since the head is no longer loaded by launching it down an angled ramp, but may rather be "dropped" onto (i.e., allowed to fall under the action of gravity), or positioned over the disk 11. As a result of the elimination of the loading ramp and cam, the adaptive suspension 12 permits the achievement of a more compact disk to disk spacing than can be achieved by conventional designs. By using the present invention it is alternatively possible to eliminate the loading ramp all together, which may further simplify the drive design and optimize the flying head performance.

Figure 5:
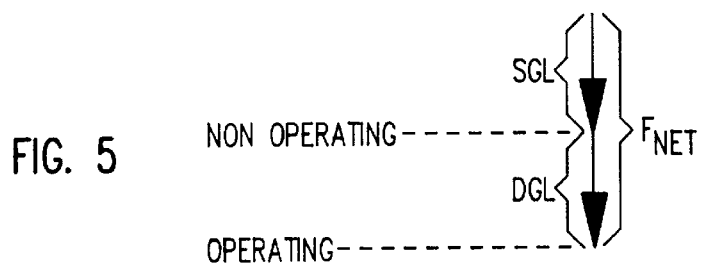
FIG. 5 is an enlarged view of a slider secured to the suspension such as shown in FIGS. 1 and 2, illustrating the various forces applied on the slider.

Referring to FIG. 5, the resulting net force (Fnet) transmitted from the load beam 20 to the slider 16, via the flexure 15, is equal to the air bearing pressure integrated over the air bearing surface of the slider 16. As further defined by the following equation (3), the net force (Fnet) is related to a dynamic gram load (DGL) which provides the necessary compensation to maintain a head 14 (FIG. 1) at a substantially uniform flying height or some other optimal flying height profile across the entire surface of the disk 11:

$$F_{NET} = \text{static gram load (SGL)} + \text{dynamic gram load (DGL)}. \quad (3)$$

Figure 6:
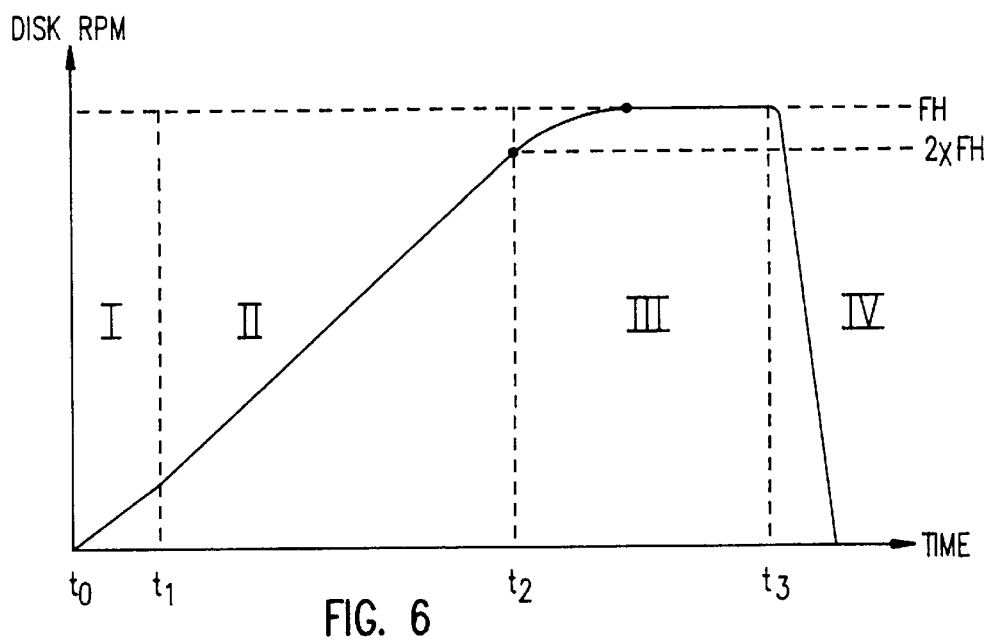
FIG. 6 is a graph plotting the data storage medium rotational speed in RPM during the suspension loading/unloading process.

FIG. 6 is a graph plotting the rotational speed of the disk 11 in revolutions per minute (RPM) during the adaptive suspension load/unload process. The loading process includes three stages: (I) the initial loading stage; (II) the speed loading stage; and (III) the final loading stage.

Stage I—The Initial Loading

The Initial loading stage spans between time $t_0$ and $t_1$, during which period an aerodynamic interaction between the disk 11 and the load beam 20 is initiated in preparation for speed loading. As the disk 11 starts to rotate or move, the head 14 can be loaded vertically onto the disk 11 instead of radially along a ramp. Vertical loading refers to the loading of the head 14 substantially in the direction in which the air bearing force is expected to develop. The ability of the suspension 12 to be vertically loaded onto the disk 11 is important in that it allows the slider 16 to develop an air bearing with minimal roll, which enhances the development of the air bearing and allows it to develop faster. As an example, the period $(t_1 - t_0)$ of the initial stage may vary between 10 ms and 100 ms.

At time $t_0$ the disk 11 is rotated at a relatively low angular speed, for example between 10% and 50% of full speed. In conventional CSS disk drives, the head is typically loaded and/or unloaded at the inner diameter (ID) of the disk 11, and therefore the access of the OD data tracks is delayed. In other conventional drives, the head is typically loaded and/or unloaded at the OD of the disk 11, and therefore the access of the ID data tracks is delayed. In addition, conventional designs may not permit data tracks to be located in the loading/unloading zone, whether at the ID or the OD of the disk.

The present invention enables data tracks to be located at any position across the disk 11, including the loading/unloading zone (at the ID or OD of the disk 11) due to the gentleness of the loading process in general. At time $t_1$ the slider 16 will be hovering over, or close to the OD tracks of the disk 11, thus allowing fast access to these OD tracks. Once the initial loading stage is completed at time $t_1$, the suspension 12 is said to have been activated dynamically, which will enable the speed loading to be completed in a relatively predictable fashion.

While it is a stated object of the present invention to substantially reduce, if not eliminate CSS process in head loading/unloading mechanisms, it should be understood that the present invention is compatible with CSS devices. In other words, the aerodynamic device 26 and the other aerodynamic devices described herein may be used in conjunction with CSS designs. As an example, in a CSS mode of operation, the initial loading stage (i.e., Stage 1) is done in the CSS loading zone, which is typically at the ID of the disk 11, when the air bearing has formed. Thereafter, upon completion of the initial loading phase, the head 14 may be moved to a position above approximately the destination data track, at which location the remaining loading stages: the speed loading stage, and the final loading stage occur. In the CSS mode of operation the static gram load is lower than the full operation gram load. As a result, the take off velocity of the air bearing would occur at a lower speed of the disk 11, thus reducing wear at the head/disk and improving reliability.

In conventional dynamic loading disk drives, the head is loaded at the OD of the disk. However, due to angled ramp loading, this loading zone is not used for data storage. The gentleness of the loading process of the present adaptive load/unload suspension 12, permits the elimination of the angled ramp all together, and the head 14 may be loaded at any track on the disk 11, between the ID and OD. As a result, it is now possible to increase and to optimize storage onto the disk 11.

During this initial loading stage and the subsequent speed loading and final loading stages, the device 26 generates a dynamic gram load force (DGL) on the slider 16 attracting it toward the disk 11. The net force (Fnet) acting on the slider 16 is equal to the sum of DGL and SGL. During the non-operating condition of the disk 11, the preload (or SGL) on the suspension 12 is equal to Fnet. According to the present invention the preload can be finite or even infinitesimal.

Since the initial loading stage of the head 14 is very gentle, a drive utilizing the compensation mechanism 26 of the present invention may be used with various types of data storage media. For example, the head 14 has a higher level of tolerance to uneven disk topographies. In addition, the dynamic loading of the head 14 substantially reduces, if not totally eliminates startup stiction, and is also compatible with drives operating at high speeds, for example at speeds that exceed 1000 rotations per minute (RPMs), such as 4500 RPMs. In one example, the disk 11 has an operating linear speed at the innermost data track of 100 inch per second or higher.

Stage II—Speed Loading

Speed loading spans between time $t_1$ and $t_2$, and includes a very rapid acceleration of the disk RPM in order to minimize the overall loading time to a point where the flying height at time $t_2$ is about two to ten times the final operational flying height (FH) of the slider 16. The actual range of flying height in this stage depends on the air bearing design and topography of the disk 11. This rapid speed loading ability enhances the overall disk drive response. As an illustrative example, a portable (or laptop) computer typically includes a power conservation feature which enables it to go to a sleep mode, which slows down or even stops the disk 11 in order to conserve power. Every time the active mode is resumed in a conventional portable computer the dynamic head loading sequence slows downs the system response. The present invention improves the system level response and reduces the power-on access time. In one embodiment the speed loading stage causes the disk 11 to accelerate to a speed in excess of approximately 100 inches per second.

Stage III—Final Loading

During this final loading stage the disk 11 has a very gentle RPM acceleration that gently brings the head (14) flying height, pitch and roll to operating conditions. Consequently, due to the gentleness of this stage, the HGA 10 can complete the head loading in a very reliable fashion, with a wide ramp angle tolerance even if used with a loading ramp, and enables the head loading/unloading to occur over data tracks.

If a preload (SGL) were imparted to the load beam 20, the SGL could be smaller than the DGL. If a ramp were used during loading, less wear is induced on the ramp and the suspension 12 due to the smaller preload force. Also the ramp design tolerance will be less critical for the aerodynamic performance of the slider 16 because the final loading is still substantially dominated by the generation of the DGL.

At elevated altitude conditions, air density decreases causing ambient pressure to decrease, and resulting in a lower adaptive gram load. Consequently, for the same head, the total gram load at an elevated altitude is lower than the total gram load at sea level. This causes a significant reduction of the slider flying height altitude sensitivity in conventional air bearing designs. It is believed that the present adaptive loading/unloading scheme substantially compensates for altitude variations and provides the air bearing design with an additional degree of freedom to achieve a more uniform flying height and improved altitude sensitivity than under a constant preload.

Figure 7:
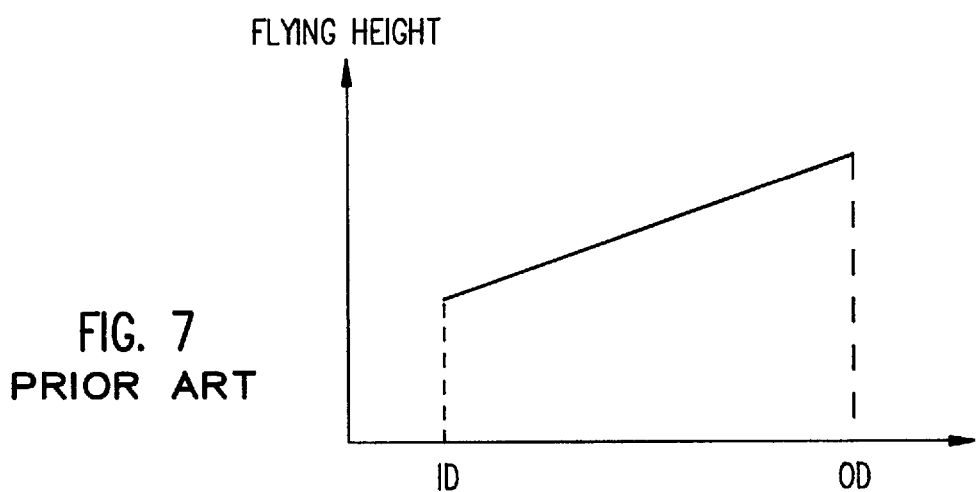
FIG. 7 is a graph plotting the flying height variation between the inner diameter (ID) or outer diameter (OD) of the data storage medium when the suspension is submitted to a fixed preload (or gram load) as experienced in the prior art.

FIG. 7 illustrates a prior art flying height profile of a twin rail taper flat suspension relative to the ID and OD of the disk 11. This profile illustrates the significant non-uniformity between the flying heights at the OD tracks and the ID tracks, as the relative velocity of the head increases, i.e., toward the OD tracks. Such non-uniformity is due in part to the fact that the preload (fixed gram load or static gram load) is not compensated.

Figure 8:
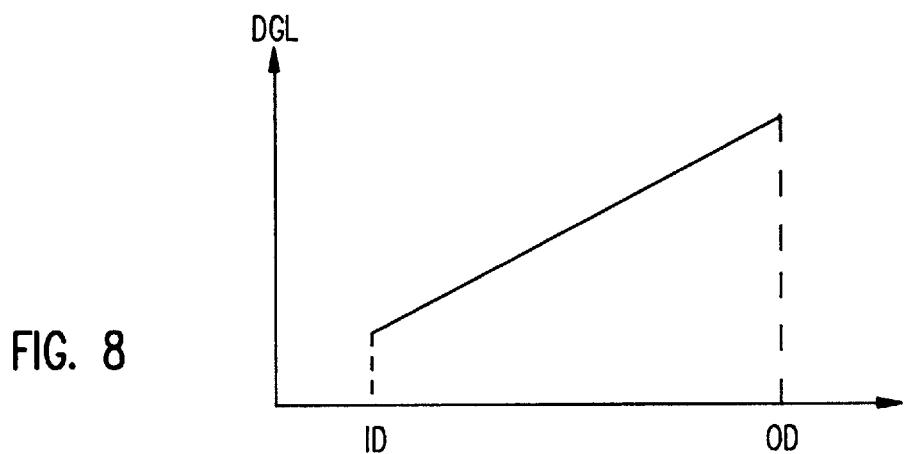
FIG. 8 is a graph plotting the aerodynamic gram load (DGL) variation generated by the suspension of FIG. 1 between the ID and the OD of the data storage medium.
Figure 9:
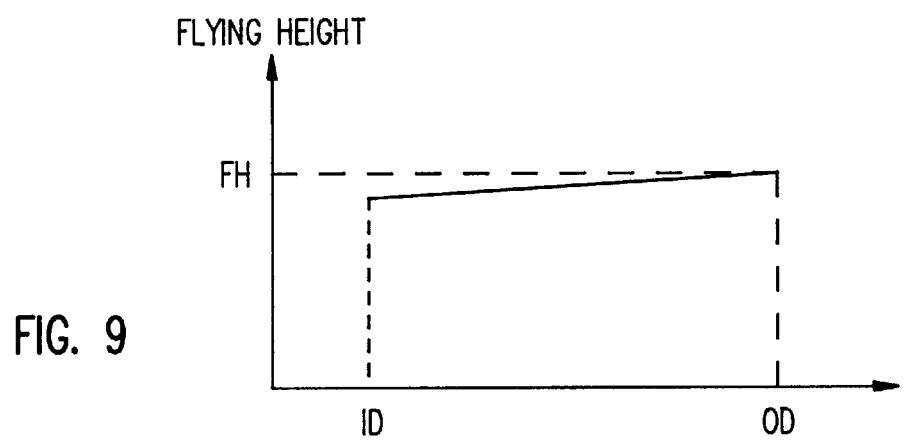
FIG. 9 is a graph plotting the flying height of the slider bonded to the suspension of FIG. 1 between the ID and the OD of the data storage medium.

FIG. 8 illustrates the compensation DGL profile relative to the ID and OD of the disk 11. Generally, a lower disk speed at the ID generates a lower DGL, and a higher disk speed at the OD generates a higher DGL. The slower velocity at the ID (inner diameter) of the disk tracks allows the slider 16 to fly higher above the disk surface due to the lower DGL. Similarly, the higher velocity of the disk OD (outer diameter) tracks allows the slider 16 to be attracted toward the disk surface due to the higher DGL. As a result, and as illustrated in FIG. 9, the effect of the preload (SGL) is automatically compensated so that the slider 16 flies at a substantially uniform and optimal flying height above the disk surface.

In one embodiment, the loading process may be programmable by customizing the rotational speed (i.e., RPM) and the acceleration of the disk for optimal air bearing design by means of a microprocessor control and feedback circuit (not shown). In another embodiment, since the slider 16 flies in proximity to the disk 11, the disk 11 is allowed to rotate for a predetermined period of time before final loading to allow the moving air to clean the slider (16) air bearing surface by removing dust or other particles. This feature is particularly important for optical disk drive applications where dust can interfere with the path of the optical beam and degrade the signal.

Figure 10:
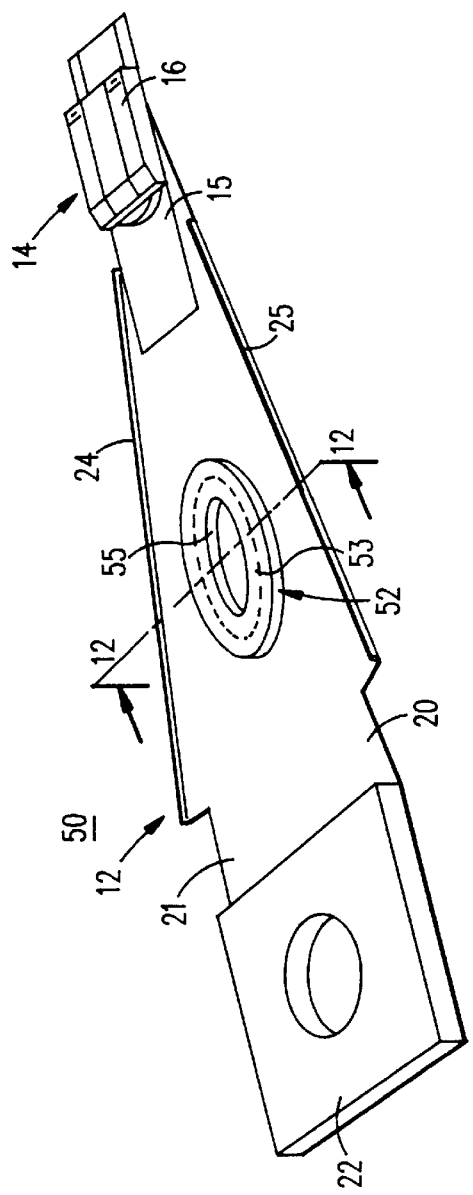
FIG. 10 is a perspective view of a suspension including an aerodynamic device according to another embodiment of the present invention.
Figure 11:
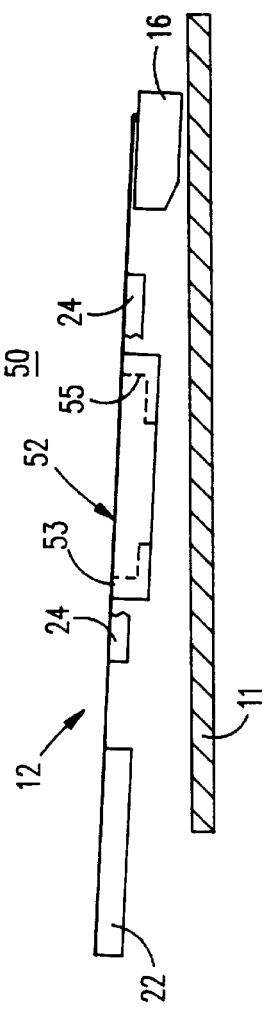
FIG. 11 is a side view of the suspension of FIG. 10 shown positioned above a data storage medium.
Figure 12:
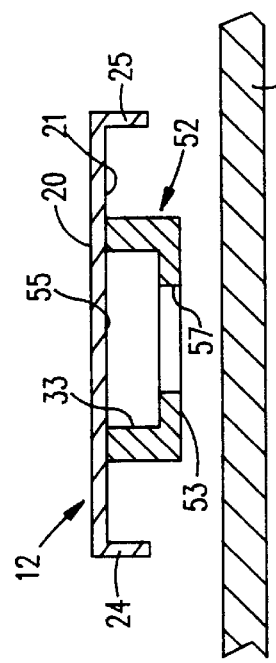
FIG. 12 is a cross-sectional view of the suspension and the aerodynamic device of FIG. 10 taken along line 12—12.

FIGS. 10–12 illustrate an HGA 50 according to another embodiment of the present invention. The HGA 50 is generally similar in function and design to the HGA 10, except that it includes a different device 52. The device 52 has a generally similar elliptical contour to that of the device 26, and further includes a centrally open cap 53 that defines a cavity 55 with the underside 21 of the load beam 20 and the upright wall 33 of the device 52.

In one embodiment the wall 33 extends from the underside 21. While the cap 53 is illustrated as having a centrally located opening 57 it should be clear that the cap 53 may have two or more openings that are optimally patterned and positioned to achieve the desired system performance. The opening 57 may have any desirable geometrical shape. In this particular example the opening 57 is shown as being elliptically shaped. However, in another embodiment the opening 57 may be circularly shaped.

Figure 13:
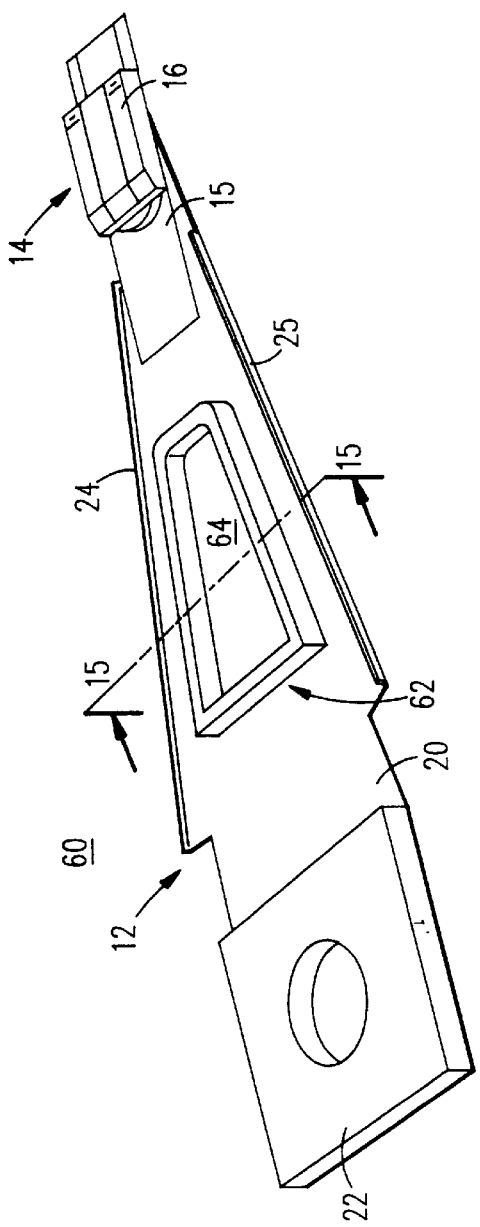
FIG. 13 is a perspective view of a suspension including an aerodynamic device according to another embodiment of the present invention.
Figure 14:
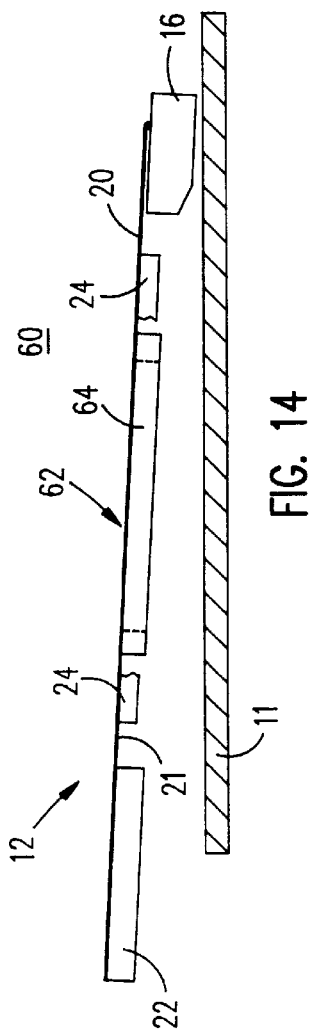
FIG. 14 is a side view of the suspension of FIG. 13 shown positioned above a data storage medium.
Figure 15:
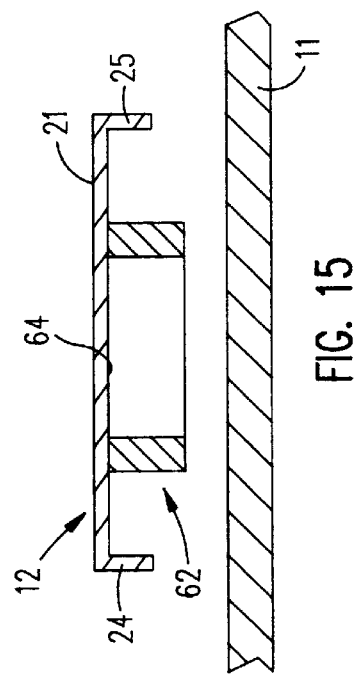
FIG. 15 is a cross-sectional view of the suspension and the aerodynamic device of FIG. 13 taken along line 15—15.

FIGS. 13–15 illustrate an HGA 60 according to another embodiment of the present invention. The HGA 60 is generally similar in function and design to the HGA 10, except that it includes a different device 62. The device 62 has a closed loop ring shaped configuration and defines a cavity 64 with the underside 21 of the load beam 20. This example illustrates the fact that the aerodynamic device 62 may have various shapes and is not limited to those specifically disclosed herein.

Figure 16:
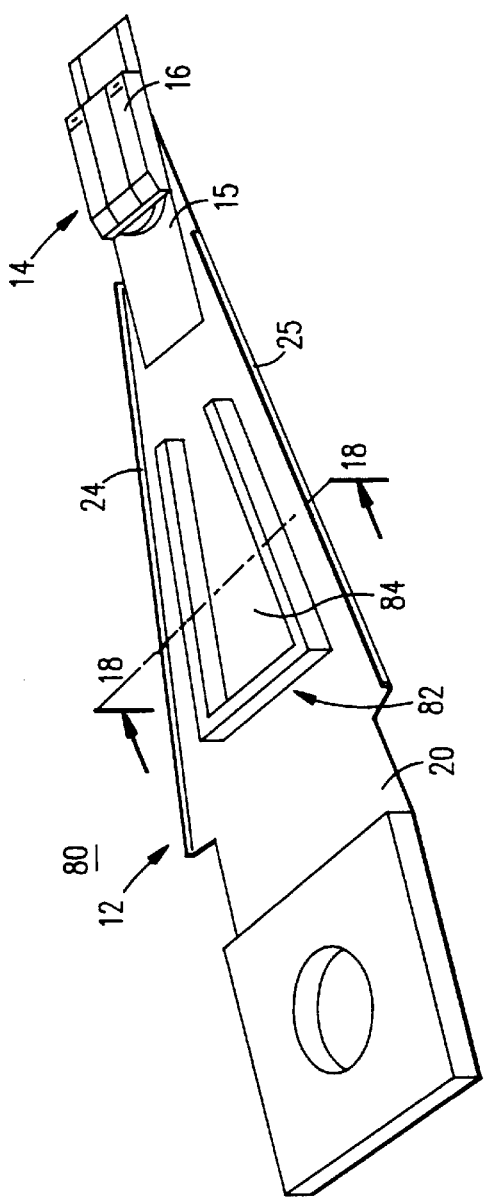
FIG. 16 is a perspective view of a suspension including an aerodynamic device according to another embodiment of the present invention.
Figure 17:
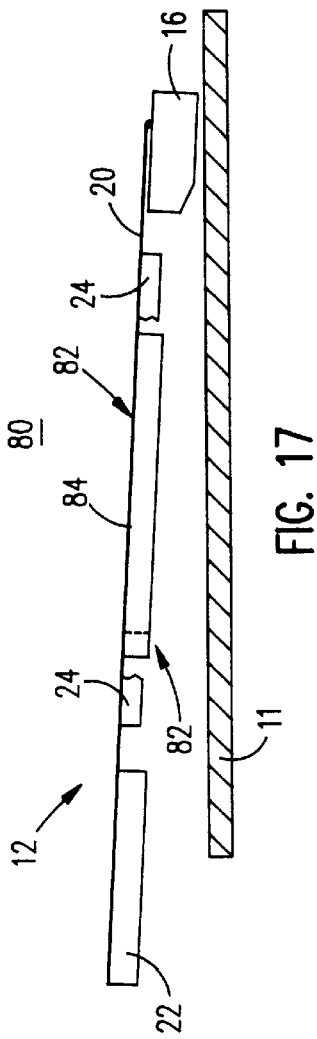
FIG. 17 is a side view of the suspension of FIG. 16 shown positioned above a data storage medium.
Figure 18:
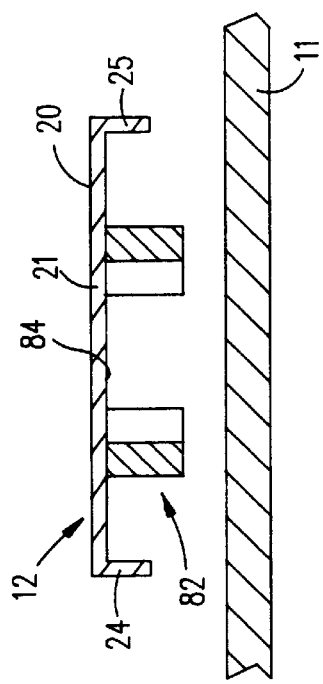
FIG. 18 is a cross-sectional view of the suspension and the aerodynamic device of FIG. 16 taken along line 18—18.

FIGS. 16–18 illustrate an HGA 80 according to another embodiment of the present invention. The HGA 80 is generally similar in function and design to the HGAs described herein, and includes a differently shaped device 82. The device 82 is U-shaped, and defines a cavity 84 with the underside 21 of the load beam 20.

Figure 19:
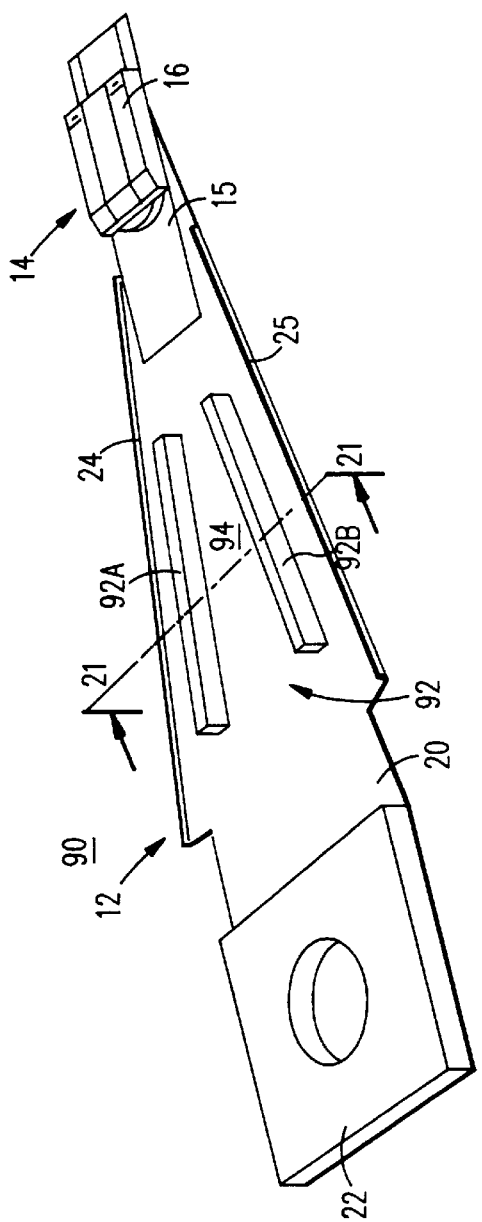
FIG. 19 is a perspective view of a suspension including an aerodynamic device according to another embodiment of the present invention.
Figure 20:
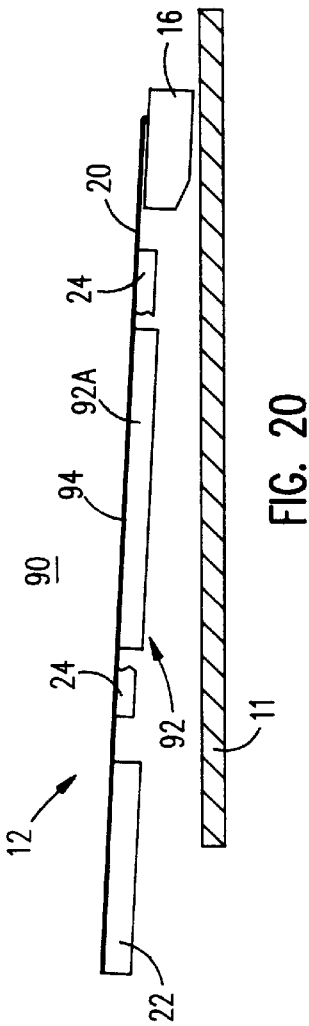
FIG. 20 is a side view of the suspension of FIG. 19, shown positioned above a data storage medium.
Figure 21:
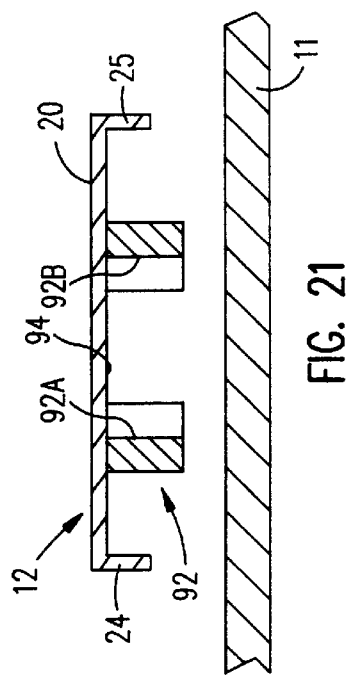
FIG. 21 is a cross-sectional view of the suspension and the aerodynamic device of FIG. 19 taken along line 21—21.
Figure 25:
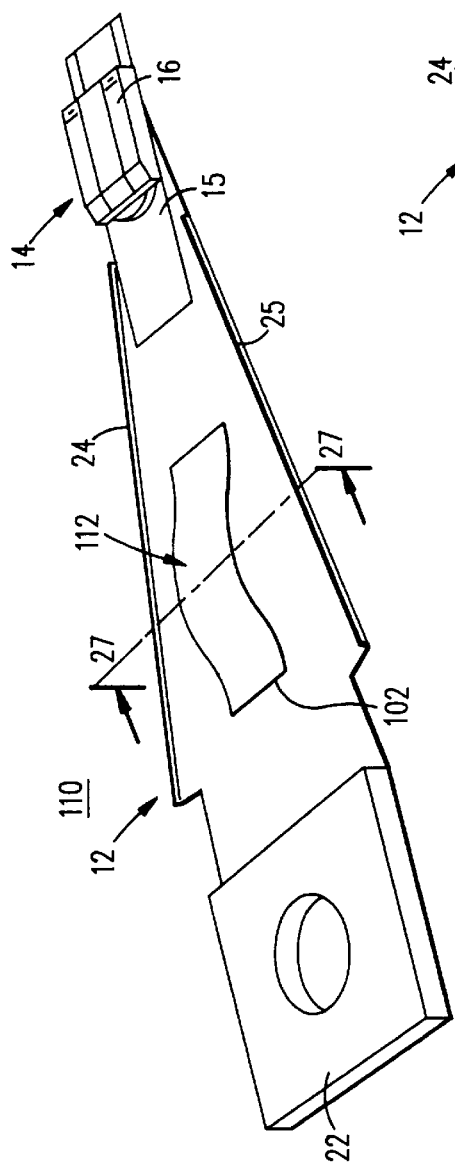
FIG. 25 is a perspective view of a suspension including an aerodynamic device according to another embodiment of the present invention.
Figure 26:
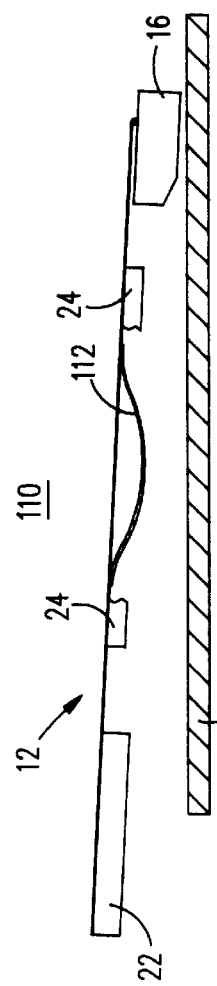
FIG. 26 is a side view of the suspension of FIG. 25 shown positioned above a data storage medium.
Figure 27B:
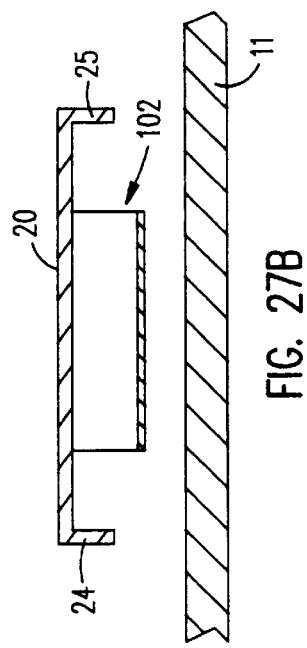
FIG. 27B is a cross-sectional view of the suspension and an alternative aerodynamic device of FIG. 25 taken along line 27—27.
Figure 27A:
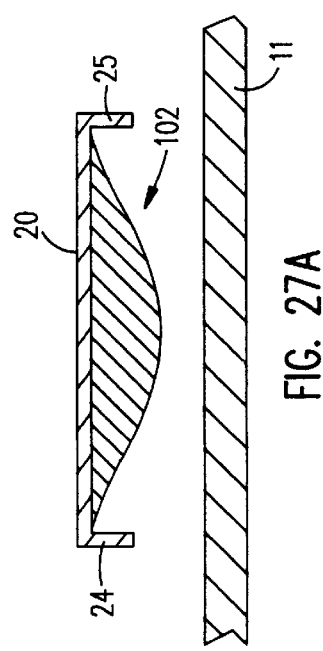
FIG. 27A is a cross-sectional view of the suspension and the aerodynamic device of FIG. 25 taken along line 27—27.

For the purpose of illustration, a rotary actuator platform is described. FIGS. 19–21 illustrate an HGA 90 according to another embodiment of the present invention. The HGA 90 is generally similar in function and design to the HGAs described herein, and includes a device 92. The device 92 is formed of at least two bars 92A, 92B that are preferably symmetrically disposed relative to the major axis of the load beam 20. The device 92 provides a suitable open channel 94 between the two bars 92A, 92B for creating the desired DGL. The length of the bars vary with the size of the suspension 12 and the application for which the HGA 90 is designed. Depending on the specific application, the length of the bars 92A, 92B may be different and the channel 94 may not be symmetrical relative to the suspension axis. In the present example the channel 94 converges toward the slider 16.

FIGS. 22–24 illustrate an HGA 100 according to another embodiment of the present invention. The HGA 100 is generally similar in function to the HGAs described herein, and includes a device 102. The device 102 is solid and generally cube shaped, though alternative shapes can be used. The device 102 is preferably symmetrically disposed relative to the major axis of the load beam 20. The dimensions of the device 102 vary with the size of the suspension 12 and the application for which the HGA 102 is designed.

FIGS. 25, 26, 27A, 27B illustrate an HGA 110 according to another embodiment of the present invention. The HGA 110 is generally similar in function to the HGAs described herein, and includes an device 112. The device 112 has a special aerodynamic design, which in this case is foil like, to clarify that the invention may be implemented with various custom shaped devices whose shapes are not expressly disclosed herein. In this example, the device 112 is preferably symmetrically disposed relative to the major axis of the load beam 20, though an asymmetrical placement or a symmetrical shape also may be used. The dimensions of the device 112 vary with the size of the suspension 12 and the application for which the HGA 112 is designed. The device 112 may be formed as an integral part of the load beam 20 by deforming the load beam 20.

Stage IV—Unloading and Parking

Figure 29:
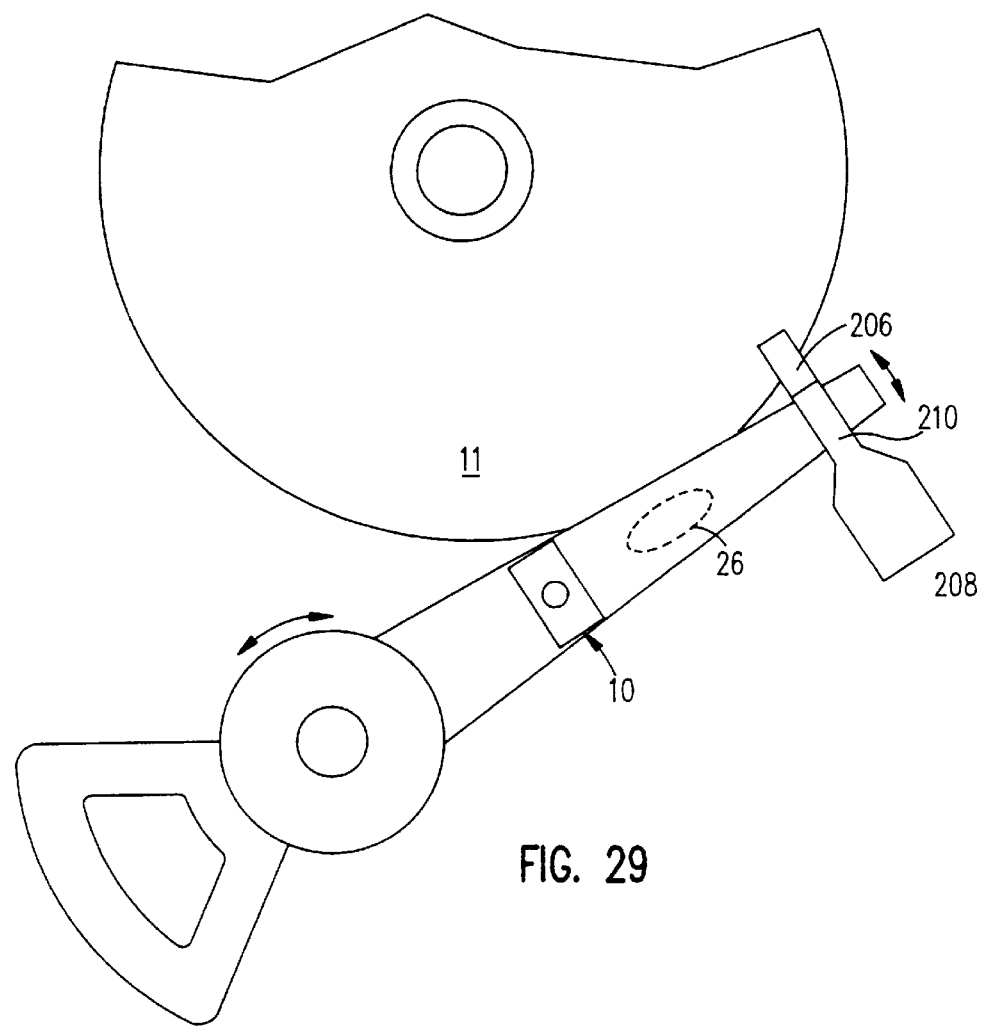
FIG. 29 is a top plan view of the suspension shown parked in the cage of FIG. 28.
Figure 28:
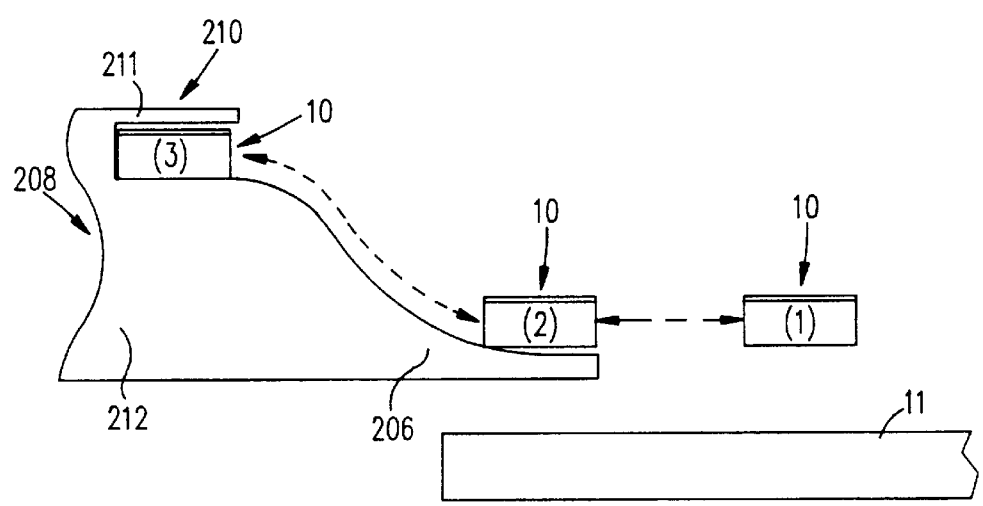
FIG. 28 is a front view of the suspension of FIG. 1, illustrating the loading and unloading process, according to the present invention, and showing a cage in which the suspension is parked.

The unloading and parking stage of the suspension 12 will now be described in relation to FIGS. 6, 28 and 29. When the power to the disk 11 is turned off at time $t_3$ (FIG. 6), the disk 11 slows down, the suspension 12 automatically separates the slider air bearing surface from the disk 11 due to the reduction or the elimination of the dynamic gram load (DGL), since the DGL is a function of the disk rotation. Once the disk 11 slows down, the suspension 12 tends to return to its static position above the disk 11, thus separating the slider 16 from the disk 11. This is illustrated by position (1) of the suspension 12 in FIG. 28.

The suspension 12 is then rotated at a fast speed, and is caused to ride onto a ramp 206 forming part of a parking cage 208, to position (2). The suspension 12 is then rotated further so that the ramp 206 guides the suspension 12 to a resting position in a parking station 210, at position (3), where it is retained by friction and motion constraints at the top and bottom of the suspension 12.

Since the DGL is negligible at the end of the unloading stage, and in the specific embodiment in which SGL is very small or infinitesimal, Fnet is very small, and therefore the ramp 206 may be eliminated since the suspension 12 is capable of moving in a plane substantially parallel to the disk surface. In such an alternative embodiment the parking station 210 is located in substantially the same plane at position (1) of the suspension.

The cage 208 may be made of metal, plastic or any other suitable material that does not emit contamination, such as aluminum. The parking station 210 acts as a stop for the suspension 12, and holds it in the parking position (3) by means of a limiter plate 211 until reloaded unto the disk 11. The cage 208 further includes a block 212 that connects the cage 208 to other cages in a head stack assembly (not shown). In the CSS drive configuration, the head unloading will occur in the reverse sequence of the loading process.

It should be understood that the geometry and dimensions described herein may be modified within the scope of the invention. The geometries of the various aerodynamic devices may be modified depending upon the disk drive operating characteristics. Other modifications may be made when implementing the invention for a particular environment. Further, the dynamic loading/unloading operation of the suspension 12 may be fully programmable and related to the disk rotational speed and acceleration. In addition, it is also possible to use one or more aerodynamic devices on a single load beam 20. While the present invention has been described in connection with a rotary actuator, the inventive concept is equally applicable to other types of actuators.

What is claimed is:

1. A method for loading and unloading a suspension formed with a load beam, relative to a rotatable storage medium comprising:

rotating said storage medium;

automatically altering a pressure profile acting on an underside of said load beam when the storage medium is rotating, by an aerodynamic compensation mechanism defined on said underside, wherein said underside faces said storage medium;

such that a variable dynamic gram load is applied to said suspension for attracting the suspension toward the rotating storage medium.

2. The method according to claim 1, further including the steps of loading the suspension in three stages comprising:

an initial loading stage;

a speed loading stage; and a final loading stage.

3. The method according to claim 2, wherein said initial loading stage includes the steps of:

rotating the storage medium at a low speed; and loading the suspension onto the magnetic medium in a substantially vertical direction.

4. The method according to claim 2, wherein said speed loading stage includes rapidly accelerating the rotation of the storage medium.

5. The method according to claim 2, wherein said final loading stage includes gently accelerating the rotation of the storage medium.

6. The method according to claim 2, wherein said three loading stages are effectuated by programmable means.

7. The method according to claim 2, including the step of rotating the storage medium for a predetermined period of time before final loading to allow moving air for cleaning a read-write head secured to the load beam.

8. The method according to claim 2, further including the step of unloading and parking the suspension in a cage.

9. The method according to claim 2, wherein said initial loading stage includes self-loading the suspension with a preload ranging from zero gram load to approximately below full gram load at operating conditions.

10. The method according to claim 3, further including the step of allowing said storage medium to rotate for a predetermined period of time before said final loading stage to allow air moving a support element carrying a head and said storage medium to clean said head.

11. The method according to claim 4, wherein said speed loading stage includes accelerating the rotation of the storage medium to a speed in excess of approximately 1000 rotations per minute.

12. The method according to claim 4, wherein said speed loading stage includes accelerating the rotation of the storage medium to a speed in excess of approximately 100 inches per second.

* * * * *